(12) United States Patent
Golikov et al.

(10) Patent No.: US 12,111,399 B2
(45) Date of Patent: Oct. 8, 2024

(54) LIDAR DETECTION METHODS AND SYSTEMS WITH OPTICAL FIBER ARRAY

(71) Applicant: YANDEX SELF DRIVING GROUP LLC, Moscow (RU)

(72) Inventors: Andrey Victorovich Golikov, Moscow (RU); Nikolay Evgenievich Orlov, Sarapul (RU); Dmitry Valentinovich Solomentsev, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 736 days.

(21) Appl. No.: 17/116,195

(22) Filed: Dec. 9, 2020

(65) Prior Publication Data

US 2021/0190960 A1 Jun. 24, 2021

(30) Foreign Application Priority Data

Dec. 23, 2019 (RU) .................................. 2019143315

(51) Int. Cl.
*G01S 17/931* (2020.01)
*G01S 7/484* (2006.01)
(Continued)

(52) U.S. Cl.
CPC ............ *G01S 17/931* (2020.01); *G01S 7/484* (2013.01); *G01S 7/486* (2013.01); *G01S 17/933* (2013.01); *G02B 26/0833* (2013.01)

(58) Field of Classification Search
CPC ........ G01S 7/00; G01S 7/4811; G01S 7/4812; G01S 7/4815; G01S 7/4817;
(Continued)

(56) References Cited

U.S. PATENT DOCUMENTS 5,095,472 A 3/1992 Uchino et al.
5,317,148 A 5/1994 Gray et al.
(Continued)

FOREIGN PATENT DOCUMENTS

CN 101105532 A 1/2008
CN 100416948 C 9/2008
(Continued)

OTHER PUBLICATIONS

Partial European Search Report issued in corresponding European patent application No. 20190274.9 on Feb. 1, 2021.
(Continued)

*Primary Examiner* — Luke D Ratcliffe
(74) *Attorney, Agent, or Firm* — BCF LLP

(57) ABSTRACT

The disclosed systems, and methods are directed to a LiDAR system comprising a radiation source for emitting a plurality of output beams, a microelectromechanical (MEM) component having a reflective surface for receiving the plurality of output beams and for reflecting the plurality of output beams towards the region of interest, a detection system for detecting a plurality of input beams from the region of interest, the detection system comprising a fibre optic array arranged to transmit the plurality of input beams to at least one photodetector, the fibre optic array comprising a plurality of optical fibres, each optical fibre having a receiving end, the receiving ends of the plurality of optical fibres being arranged in a two dimensional array and a receiving lens for focussing a given input beam of the plurality of input beams to a given receiving end of a given optical fibre of the fibre optic array.

18 Claims, 10 Drawing Sheets

(51) Int. Cl.
  *G01S 7/486* (2020.01)
  *G01S 17/933* (2020.01)
  *G02B 26/08* (2006.01)
(58) Field of Classification Search
  CPC ........ G01S 7/4818; G01S 7/484; G01S 7/486; G01S 17/42; G01S 17/931; G01S 17/933; G02B 26/0833
  See application file for complete search history.

(56) References Cited

U.S. PATENT DOCUMENTS

| | | | |
|---|---|---|---|
| 5,359,403 | A | 10/1994 | Grosmann et al. |
| 6,034,811 | A | 3/2000 | Seaver |
| 6,330,095 | B1 * | 12/2001 | Ozawa ................. G01S 7/4812 359/210.1 |
| 6,646,725 | B1 | 11/2003 | Eichinger et al. |
| 6,804,269 | B2 | 10/2004 | Lizotte et al. |
| 7,440,084 | B2 | 10/2008 | Kane |
| 7,847,235 | B2 | 12/2010 | Krupkin et al. |
| 7,936,448 | B2 | 5/2011 | Albuquerque et al. |
| 8,212,995 | B2 | 7/2012 | Koehler et al. |
| 8,508,723 | B2 | 8/2013 | Chang et al. |
| 8,946,637 | B2 | 2/2015 | Chinn et al. |
| 9,063,549 | B1 | 6/2015 | Pennecot et al. |
| 10,120,214 | B2 | 11/2018 | Irish et al. |
| 10,281,582 | B2 * | 5/2019 | Elooz .................... G01S 17/931 |
| 10,564,267 | B2 | 2/2020 | Grauer et al. |
| 10,571,552 | B1 | 2/2020 | Gao et al. |
| 10,976,413 | B2 | 4/2021 | Han et al. |
| 11,112,491 | B2 | 9/2021 | Abediasl et al. |
| 11,428,818 | B2 | 8/2022 | Petit |
| 11,567,175 | B2 | 1/2023 | Roger et al. |
| 2002/0110077 | A1 | 8/2002 | Drobot et al. |
| 2002/0196534 | A1 | 12/2002 | Lizotte et al. |
| 2006/0132752 | A1 * | 6/2006 | Kane ........................ G01S 17/42 356/5.01 |
| 2009/0262760 | A1 | 10/2009 | Krupkin et al. |
| 2010/0271614 | A1 | 10/2010 | Albuquerque et al. |
| 2011/0137126 | A1 * | 6/2011 | French .................... G02B 23/26 600/178 |
| 2011/0228249 | A1 | 9/2011 | Koehler et al. |
| 2012/0206712 | A1 | 8/2012 | Chang et al. |
| 2014/0231647 | A1 | 8/2014 | Chinn et al. |
| 2015/0176977 | A1 | 6/2015 | Abele et al. |
| 2016/0187469 | A1 | 6/2016 | Jeong et al. |
| 2017/0214839 | A1 | 7/2017 | Keller et al. |
| 2017/0234976 | A1 | 8/2017 | Grauer et al. |
| 2017/0248783 | A1 | 8/2017 | Gruhlke |
| 2017/0307758 | A1 | 10/2017 | Pei et al. |
| 2018/0054610 | A1 | 2/2018 | Shpunt et al. |
| 2018/0095304 | A1 | 4/2018 | Irish et al. |
| 2018/0100929 | A1 * | 4/2018 | O'Keeffe ............... G01S 17/931 |
| 2018/0120441 | A1 | 5/2018 | Elooz et al. |
| 2018/0180720 | A1 | 6/2018 | Pei et al. |
| 2018/0217237 | A1 | 8/2018 | Irish |
| 2018/0231640 | A1 | 8/2018 | Han et al. |
| 2018/0275249 | A1 | 9/2018 | Campbell et al. |
| 2018/0306925 | A1 | 10/2018 | Hosseini et al. |
| 2018/0329037 | A1 | 11/2018 | Bozchalooi et al. |
| 2019/0004151 | A1 | 1/2019 | Abediasl et al. |
| 2019/0041498 | A1 | 2/2019 | Droz et al. |
| 2019/0094345 | A1 | 3/2019 | Singer et al. |
| 2019/0101628 | A1 | 4/2019 | Roger et al. |
| 2019/0107607 | A1 | 4/2019 | Danziger |
| 2019/0137610 | A1 | 5/2019 | Li et al. |
| 2019/0146060 | A1 | 5/2019 | Qiu et al. |
| 2019/0162857 | A1 | 5/2019 | McCord et al. |
| 2019/0162947 | A1 | 5/2019 | Low |
| 2019/0195990 | A1 | 6/2019 | Shand |
| 2019/0204423 | A1 | 7/2019 | O'Keeffe et al. |
| 2019/0212418 | A1 | 7/2019 | Lee |
| 2019/0212419 | A1 | 7/2019 | Jeong et al. |
| 2019/0212420 | A1 | 7/2019 | Petit |
| 2019/0212454 | A1 | 7/2019 | Petit |
| 2019/0219698 | A1 | 7/2019 | Hoegele et al. |
| 2020/0018835 | A1 | 1/2020 | Pei et al. |

FOREIGN PATENT DOCUMENTS

| | | |
|---|---|---|
| CN | 107064946 A | 8/2017 |
| CN | 108693504 A | 10/2018 |
| DE | 4411994 A1 | 11/1995 |
| DE | 102017119038 A1 | 2/2019 |
| EP | 1508057 A2 | 2/2015 |
| RU | 2550776 C1 | 5/2015 |
| RU | 2567469 C2 | 11/2015 |
| WO | 9847036 A1 | 10/1998 |
| WO | 03098263 A2 | 11/2003 |
| WO | 18029136 A1 | 2/2018 |
| WO | 2018067158 A1 | 4/2018 |

OTHER PUBLICATIONS

European Search Report issued in European patent application No. 20190272.3 on Nov. 16, 2020.

European Search Report issued in European patent application No. 2184656.5 on Mar. 3, 2021.

Partial European Search Report issued in European patent application No. 2184656.5 on Dec. 7, 2020.

Poulton, "Long-Range Lidar and Free-Space Data Communication With High-Performance Optical Phased Arrays", IEEE Journal of Selected Topics in Quantum Electronics, vol. 25, No. 5, pp. 1-8, Sep.-Oct. 2019. Art No. 7700108, doi: 10.1109/JSTQE.2019.2908555.

Akira Akiyama et al., "Optical Fiber Imaging Laser Radar" Proceedings of SPIE—The International Society for Optical Engineering vol. 44, pp. 116-127, Nov. 2003.

European Search Report completed on Apr. 26, 2021 issued in respect of the European Patent Application No. 20190274.9.

Russian Search report issued on Jul. 6, 2021 in respect of the Russian Patent Application RU 2019143315.

Russian Search Report issued on Jun. 22, 2021 in respect of the Russian patent application No. 2019143301.

Russian Search Report issued on Jun. 10, 2021 in respect of the counterpart Russian patent application No. 2019143312.

Hair et al., "Airborne High Spectral Resolution Lidar for profiling aerosol optical properties", Applied Optics, vol. 47, No. 36, 2008, https://patarnott.com/atms360/pdf_atms360/LidarMexicoCity.pdf, p.p. 6734-6753.

Office Action issued on Oct. 27, 2023 in respect of the U.S. Appl. No. 17/110,496.

Office Action issued on Dec. 19, 2023 in respect of the related U.S. Appl. No. 17/144,151.

* cited by examiner

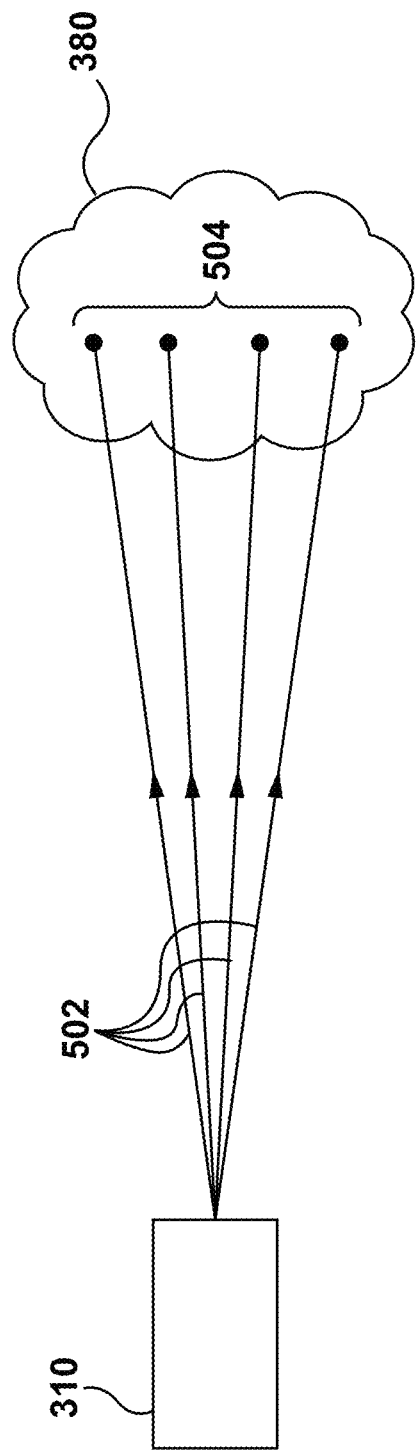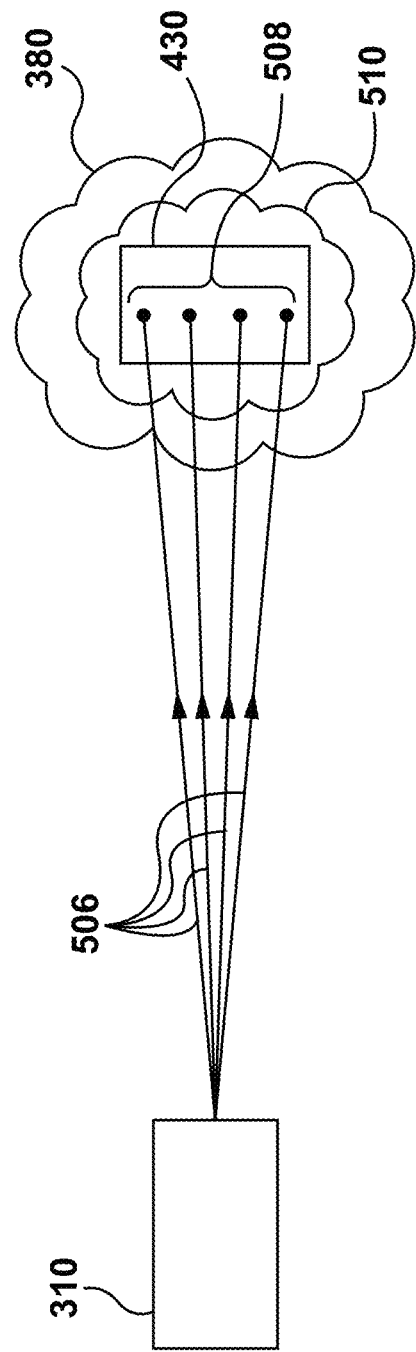
Figure 6
Figure 7

LIDAR DETECTION METHODS AND SYSTEMS WITH OPTICAL FIBER ARRAY

CROSS-REFERENCE

The present application claims priority to Russian Patent Application No. 2019143315, entitled "LiDAR DETECTION METHODS AND SYSTEMS WITH OPTICAL FIBER ARRAY", filed on Dec. 23, 2019, the entirety of which is incorporated herein by reference.

FIELD OF TECHNOLOGY

The present technology relates to Light Detection and Ranging (LiDAR) systems, and more specifically, to LiDAR systems for detecting objects in a region of interest.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect an object located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

Other technical challenges with the implementation of the above systems include de-calibration of sensors and other components that gather data about the surroundings of the vehicle. A plethora of factors, including weather, road conditions, driving habits, for example, influence sensors and other components over time, requiring calibration in order to ensure that data is accurately captured and correctly used for controlling vehicles.

In LiDAR-based systems, objects around the vehicle can be detected by transmitting beams of light towards a region of interest, and measuring reflected light beams with a detector. Lasers emitting pulses of light within a narrow wavelength are often used as the light source. The position and distance of the object can be computed using Time of Flight calculations of the emitted and detected light beam. By computing such positions as "data points", a digital multi-dimensional representation of the surroundings can be generated.

In certain conventional systems, a speed of scanning the region of interest is limited by a dependence on a reflected light from a given emitted beam being detected before the next pulse of light is emitted.

In rotational LiDAR-based systems, the light beams are caused to rotate about a horizontal or vertical axis which can provide a scan of the region of interest in the horizontal or vertical plane, respectively. Typically, such rotation of the beams is achieved by a laser which is rotatable. However, moving components of the LiDAR system are prone to wear and tear leading to premature failure of the system.

SUMMARY

Therefore, there is a need for systems which avoid, reduce or overcome the limitations of the prior art.

Micromechanical MEM) components have been proposed for LiDAR systems. In such systems, scanning on a vertical axis is available and determined by an amplitude of oscillation of the MEM component.

Developers of the present technology have identified drawbacks of prior art solutions.

For example, US 20190094345, published on Mar. 23, 2019 and currently assigned to Leica Geosystems AG, describes a laser scanner device which can be adapted to be mounted to a vehicle, the device comprising a LiDAR module working based on a laser measuring beam and time-of-flight-measurement-principle. The LiDAR module is configured to provide a horizontal field of view of at least 60°, an instantaneous vertical field of view of at least ±2°, a scan resolution of at least one point per 0.8° in horizontal and vertical direction, and a frame rate of at least 10 Hz for scanning at least the entire horizontal and instantaneous vertical field of view with said scan resolution, wherein the LiDAR module comprises a multibeam transmitter configured for generating a plurality of measuring beams.

US 20190101628, published on Apr. 4, 2019 and currently assigned to Infineon Technologies AG, describes an apparatus for light detection and ranging. The apparatus includes a reflective surface configured to oscillate about a rotation axis, and a plurality of light sources each configured to controllably emit a respective light beam via an optical system onto the reflective surface. Further, the apparatus includes a controller configured to control emission times of the plurality of light sources so that the reflective surface emits a plurality of light beams to an environment according to a first sequence of beam directions for a first measurement, and according to a second sequence of beam directions for a subsequent second measurement.

Developers have identified that in providing systems which can scan over a broader region of interest, consideration must also be given to improving one or more of a speed of scanning the region of interest which cannot be prohibitively slow, especially if the LiDAR system is associated with a moving vehicle; the ability to detect the reflected light over a broader area; cost considerations; and expected lifetime of such LiDAR systems.

Broadly, inventors have developed a LiDAR system that can scan an increased area compared to conventional systems without the use of additional light sources or moving components, in certain embodiments. In certain embodiments, LiDAR systems of the present technology have an increased angle of spread of the beam of light transmitted to the region of interest, on one or both of the horizontal or vertical axis.

In certain embodiments, advantages of the present technology include an increased density of data points in a given region of interest (ROI), and hence an increased resolution of the object in the ROI. Also, the present technology includes an increased capacity of the system without compromising an expense and complexity of the system.

In accordance with a first broad aspect of the present technology, there is provided a LiDAR system for detecting objects in a region of interest, the system comprising a radiation source for emitting a plurality of output beams, a microelectromechanical (MEM) component having a reflective surface for receiving the plurality of output beams and for reflecting the plurality of output beams towards the region of interest, the MEM component configured to oscillate about a first oscillation axis by a first oscillation amplitude to modulate each one of the plurality of output beams by a vertical interval along a vertical axis in the region of interest, a detection system for detecting a plurality of input beams from the region of interest, the detection system comprising a fibre optic array arranged to transmit the plurality of input beams to at least one photodetector, the fibre optic array comprising a plurality of optical fibres, each optical fibre having a receiving end, the receiving ends of the plurality of optical fibres being arranged in a two dimensional array, and a receiving lens for focussing a given input beam of the plurality of input beams to a given receiving end of a given optical fibre of the fibre optic array.

In some embodiments, the LiDAR system, wherein a distance between the receiving lens and the given receiving end of the given optical fibre of the plurality of optical fibres in the fibre optic array comprises a focal distance of the given input beam of the plurality of input beams.

In some embodiments, the LiDAR system, wherein a return pathway for the plurality of input beams from the region of interest to the detection system includes a sub-portion that is a same path as one used for the output beam.

In some embodiments, the LiDAR system, wherein the return pathway includes the plurality of input beams being incident on, and being reflected by, the MEM component.

In some embodiments, the LiDAR system, wherein a return pathway for the plurality of input beams from the region of interest to the detection system includes a sub-portion that is a different path as one used for the output beam.

In some embodiments, the LiDAR system, wherein the radiation source is configured to emit a given output beam of the plurality of beams independently of a detection, by the detection system, of a given input beam of the plurality of input beams.

In some embodiments, the LiDAR system, wherein the radiation source is configured to emit a given output beam of the plurality of beams in a synchronized manner with a detection, by the detection system, of a given input beam of the plurality of input beams.

In some embodiments, the LiDAR system, wherein within a given detection time interval, the receiving lens is configured to focus each given input beam of the plurality of input beams to a different given receiving end of a given optical fibre of the fibre optic array.

In some embodiments, the LiDAR system, wherein each given optical fibre of the fibre optic array has an associated photodetector.

In some embodiments, the LiDAR system, wherein at least a subset of the plurality of optical fibres of the fibre optic array have a common photodetector.

In some embodiments, the LiDAR system, wherein the radiation source is one of: a single laser system and a double laser system.

In some embodiments, the LiDAR system, wherein the MEM component is positioned on a platform which is configured to rotate on a horizontal plane.

In some embodiments, the LiDAR system, further comprising a collimator for modulating a direction of the plurality of output beams towards the MEM component.

In some embodiments, the LiDAR system, further comprising a processor which is configured to, responsive to a determination that there is an object in the region of interest, cause the first oscillation amplitude of the MEM component to be modulated to a first modulated oscillation amplitude to reduce the vertical interval of the plurality of output beams around the object.

In accordance with a second broad aspect of the present technology, there is provided a LiDAR method for detecting objects in a region of interest, the method being implemented by a processor communicatively connected to a LiDAR system, the method comprising causing a radiation source to emit an output beam towards a microelectromechanical (MEM) component, causing the MEM component to oscillate with a first oscillation amplitude to reflect and spread the output beam by a vertical interval along a vertical axis in the region of interest, detecting, by a detection system, a plurality of input beams from the region of interest, the detecting comprising receiving the plurality of input beams by a receiving lens, focussing, by the receiving lens, a given input beam of the plurality of input beams to a given receiving end of a given optical fibre of a fibre optic array, the fibre optic array comprising a plurality of optical fibres, each optical fibre having a receiving end, the given receiving ends of the plurality of optical fibres being arranged in a two dimensional array.

In some embodiments, the method, wherein the method further causing, by the processor, the radiation source to emit the plurality of output beams independently of the detection of the plurality of input beams by the detection system.

In some embodiments, the method, wherein the method further comprises causing, by the processor, the radiation source to emit the plurality of output beams in coordination with the detection of the plurality of input beams by the detection system.

In the context of the present specification, a "radiation source" broadly refers to any device configured to emit radiation such as a radiation signal in the form of a beam. A radiation source includes, but is not limited to a light source configured to emit light beams. The light source may be a laser such as a solid-state laser, laser diode, a high power laser, or an alternative light source such as, a light emitting diode (LED)-based light source. Some (non-limiting) examples of the light source are Fabry-Perot laser diode, a quantum well laser, a distributed Bragg reflector (DBR) laser, a distributed feedback (DFB) laser, or a vertical-cavity surface-emitting laser (VCSEL). In addition, light source may emit light beams in differing formats, such as light pulses, continuous wave (CW), quasi-CW, and so on. In some non-limiting examples, the light source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm or in between any other suitable range. Unless indicated otherwise, the term "about" with regard to a numeric value is defined as a variance of up to 10% with respect to the stated value.

In the context of the present specification, an "output beam" may also be referred to a radiation beam, such as a light beam, that is generated by the radiation source and is directed downrange towards a region of interest (ROI). The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" may also be referred to as a radiation beam, such as a light beam, reflected from one or more objects in the ROI. By reflected is meant that at least a portion of the light beam from the output beam bounces off the one or more objects in the ROI. The output beam may have one or more parameters such as: time-of-flight (i.e., time from emission until detection), instantaneous power (e.g., power signature), average power across entire return pulse, and photon distribution/signal over return pulse period etc.

In the context of the present specification, a "Region of Interest" may broadly include a portion of the observable environment of LiDAR system in which the one or more objects may be detected. It is noted that the region of interest (ROI) of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIGS. 6 and 7 depict representative examples of a vertical interval, and a reduced vertical interval, respectively, associated with output beams along a vertical axis, in accordance various embodiments of present technology;

DETAILED DESCRIPTION

Figure 1:
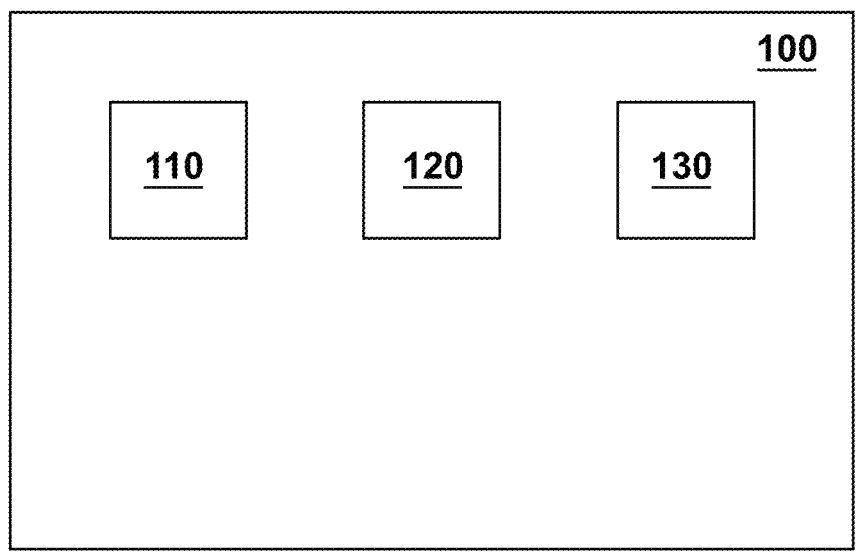
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
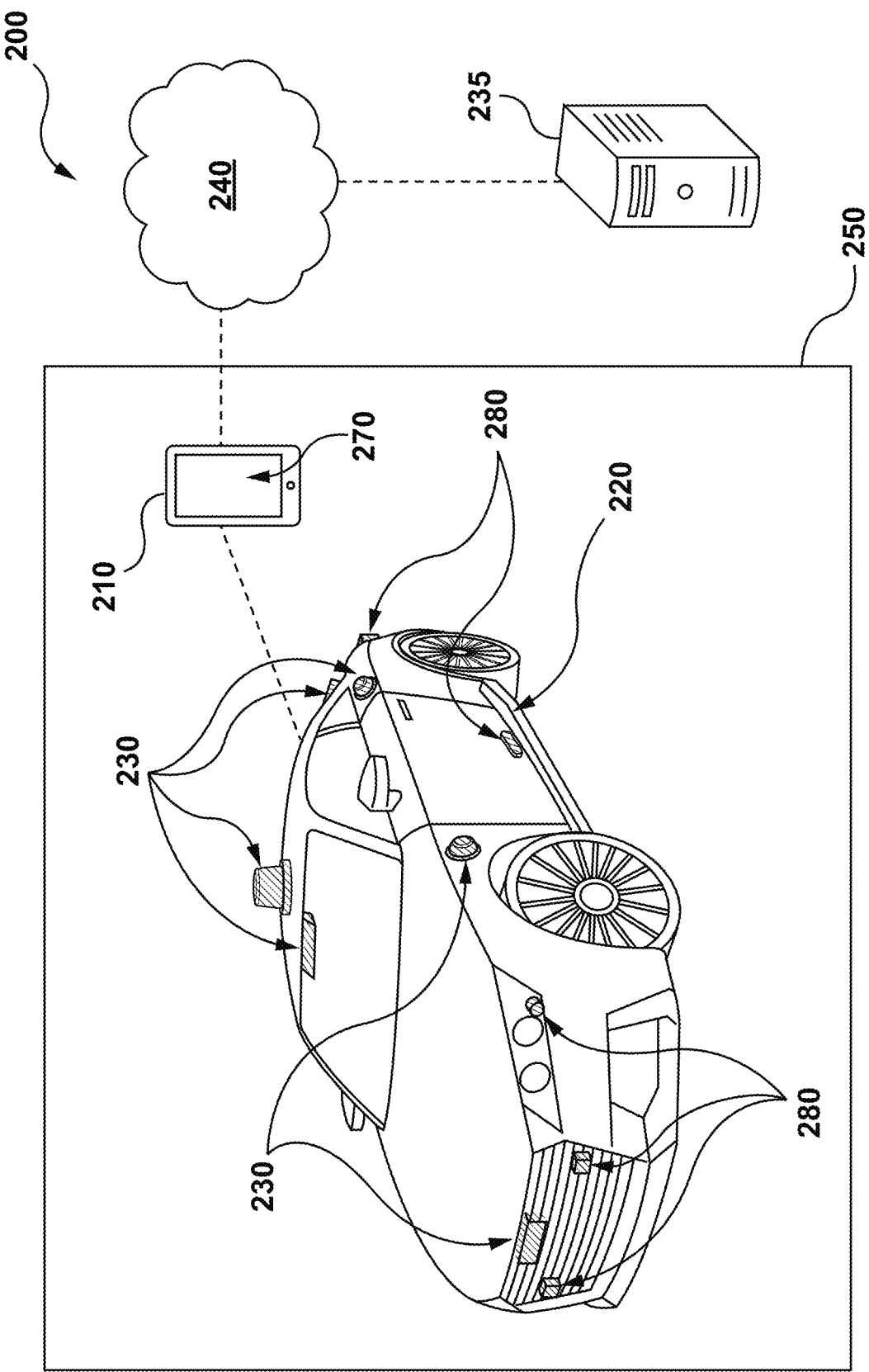
FIG. 2 depicts a networked computing environment being suitable for use with certain embodiments of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who is associated with the vehicle 220, such as an operator of the vehicle 220, a server 235 in communication with the electronic device 210 via a communication network 240 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any transportation vehicle, for leisure or otherwise, such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Car (SDC). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for processing data as will be described in greater detail below.

In some embodiments of the present technology, the communication network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 240 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 235.

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

It should be noted that a variety of sensors and systems may be used by the electronic device 210 for gathering information about the surroundings of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may comprise one or more camera-type sensor systems that are mounted to the vehicle 220 and communicatively coupled to the processor 110. Broadly speaking, the one or more camera-type sensor systems may be configured to gather image data about various portions of the surroundings 250 of the vehicle 220. In some cases, the image data provided by the one or more camera-type sensor systems may be used by the electronic device 210 for performing object detection procedures. For example, the electronic device 210 may be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 may comprise one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220 and which data may be representative of distance of objects from the radar-type sensor system, orientation of objects, velocity and/or speed of objects, and the like.

It should be noted that the plurality of sensor systems 280 may comprise additional types of sensor systems to those non-exhaustively described above and without departing from the scope of the present technology.

Furthermore, the vehicle 220 is equipped with one or more Light Detection and Ranging (LiDAR) systems 230 for gathering information about surroundings 250 of the vehicle 220. The LiDAR system 230 may be in addition to, or in some cases instead of, the plurality of sensor systems 280. A given LiDAR system 230 from the one or more LiDAR systems 230 may be mounted (or retrofitted) to the vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting the given LiDAR system 230 are within the scope of the present disclosure, including on a back window, side windows, front hood, rooftop, front grill, front bumper or the side of the vehicle 220. In some cases, the given LiDAR system 230 can even be mounted in a dedicated enclosure mounted on the top of the vehicle 220.

As mentioned above, the one or more LiDAR systems 230 may also be mounted in a variety of configurations.

In one embodiment, the given LiDAR system 230 of the one or more LiDAR systems 230 that is illustrated in FIG. 2 as being mounted to the rooftop of the vehicle 220 may be so-mounted in a rotatable configuration. For example, the given LiDAR system 230 mounted to the vehicle 220 in a rotatable configuration may comprise at least some components that are rotatable 360 degrees about an axis of rotation of the given LiDAR system 230. It should be noted that the given LiDAR system 230 mounted in rotatable configurations may gather data about most of the portions of the surroundings 250 of the vehicle 220.

In another embodiment, the given LiDAR system 230 of the one or more LiDAR systems 230 that is mounted to the side (or the front grill, for example) of the vehicle 220 may be so-mounted in a non-rotatable configuration. For example, the given LiDAR system 230 mounted to the vehicle 220 in a non-rotatable configuration may comprise at least some components that are not rotatable 360 degrees and are configured to gather data about pre-determined portions of the surroundings 250 of the vehicle 220.

Irrespective of the specific location and/or the specific configuration, the given LiDAR system 230 is configured to capture data about the surroundings 250 of the vehicle 220 for building a multi-dimensional map of objects in the surroundings 250 of the vehicle 220. How the given one or more LiDAR systems 230 are configured to capture data about the surroundings 250 of the vehicle 220 will now be described.

LiDAR System

Figure 3:
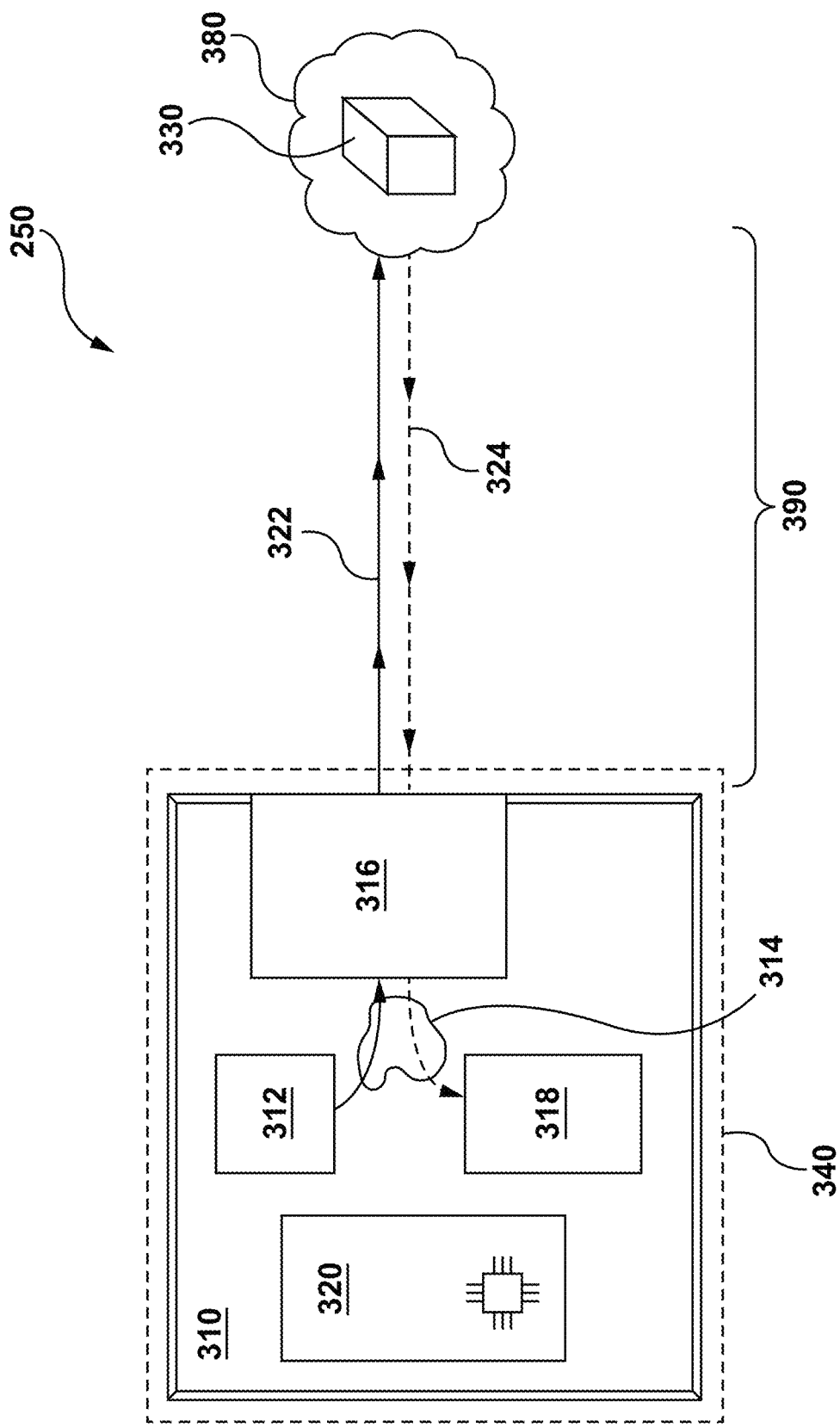
FIG. 3 depicts a schematic diagram of an example LiDAR system for implementing certain embodiments of systems and/or methods of the present technology.

With reference to FIG. 3, there is depicted a non-limiting example of a LiDAR system 310. It should be noted that the one or more LiDAR systems 230 (see FIG. 2) may be implemented in a similar manner to the implementation of the LiDAR system 310.

Broadly speaking, the LiDAR system 310 may comprise a variety of internal components such as, but not limited to: (i) a radiation source component 312, such as a light source component, (ii) a scanner component 316, (iii) a receiver component 318 (also referred to herein as detection system), and (iv) a controller component 320. It is contemplated that in addition to the internal components non-exhaustively listed above, the LiDAR system 310 may further comprise a variety of sensors (such as, for example, a temperature sensor, a moisture sensor, etc.) which are omitted from FIG. 3 for sake of clarity.

It is contemplated that, in some cases, one or more of internal components of the LiDAR system 310 may be implemented in a common housing 340 as depicted in FIG. 3. In other implementations, at least the controller component 320 may be located remotely from the common housing 340.

Radiation Source Component

The radiation source component 312 is communicatively coupled to the controller component 320 and is configured to emit radiation, such as a radiation signal in the form of a beam. In certain embodiments, the radiation source component 312 is configured to emit light, and is referred to herein as a light source component 312. The light source component 312 comprises one or more lasers that emit light having a particular operating wavelength. The operating wavelength of the light source component 312 may be in the infrared, visible, and/or ultraviolet portions of the electromagnetic spectrum. For example, the light source component 312 may include one or more lasers with an operating wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. However, it should be noted that the light source component 312 may include lasers with different operating wavelengths, without departing from the scope of the present technology. In certain other embodiments, the light source component 312 comprises a light emitting diode (LED).

In operation, the light source component 312 generates an output beam 322 of light. It is contemplated that the output beam 322 may have any suitable form such as continuous-wave, or pulsed. As illustrated in FIG. 3, the output beam 322 exits the LiDAR system 310 and is directed downrange towards the surroundings 250.

Let it be assumed that an object 330 is located at a distance 390 from the LiDAR system 310. It should be noted though, as will be explained below in greater detail, the presence of the object 330 and the distance 390 are not apriori known and that the purpose of the LiDAR system 310 is to locate the object 330 and/or capture data for building a multi-dimensional map of at least a portion of the surroundings 250 with the object 330 (and other potential objects) being represented in it in a form of one or more data points.

Once the output beam 322 reaches the object 330, the object 330 may reflect at least a portion of light from the output beam 322, and some of the reflected light beams may return back towards the LiDAR system 310. By reflected is meant that at least a portion of light beam from the output beam 322 bounces off the object 330. A portion of the light beam from the output beam 322 may be absorbed by the object 330.

In the example illustrated in FIG. 3, the reflected light beam is represented by input beam 324. The input beam 324 is captured by the LiDAR system 310 via the receiver component 318. It should be noted that, in some cases, the input beam 324 may contain only a relatively small fraction of the light from the output beam 322. It should also be noted that an angle of the input beam 324 relative to a surface of the object 330 ("angle of incidence") may be the same or different than an angle of the output beam 322 relative to surface of the object 330 ("angle of reflection").

It should also be noted that the operating wavelength of the LiDAR system 310 may lie within portions of the electromagnetic spectrum that correspond to light produced by the sun. Therefore, in some cases, sunlight may act as background noise which can obscure the light signal detected by the LiDAR system 310. This solar background noise can result in false-positive detections and/or may otherwise corrupt measurements of the LiDAR system 310. Although it may be feasible to increase a Signal-to-Noise Ratio (SNR) of the LiDAR system 310 by increasing the power level of the output beam 322, this may not be desirable in at least some situations. For example, increasing power levels of the output beam 322 may result in the LiDAR system 310 not being eye-safe.

It is contemplated that the LiDAR system 310 may comprise an eye-safe laser, or put another way, the LiDAR system 310 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

As previously alluded to, the light source component 312 may include one or more pulsed lasers configured to produce, emit, or radiate pulses of light with certain pulse duration. For example, the light source component 312 may be configured to emit pulses with a pulse duration (e.g., pulse width) ranging from 10 ps to 100 ns. In another example, the light source component 312 may emit pulses at a pulse repetition frequency of approximately 100 kHz to 5 MHz or a pulse period (e.g., a time between consecutive pulses) of approximately 200 ns to 10 μs. Overall, however, the light source component 312 can generate the output beam 322 with any suitable average optical power, and the output beam 322 may include optical pulses with any suitable pulse energy or peak optical power for a given application.

In some embodiments, the light source component 312 may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source component 312 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source component 312 may include one or more laser diodes that are current-modulated to produce optical pulses.

In some embodiments, the output beam 322 emitted by the light source component 312 is a collimated optical beam with any suitable beam divergence for a given application. Broadly speaking, divergence of the output beam 322 is an angular measure of an increase in beam size (e.g., a beam radius or beam diameter) as the output beam 322 travels away from the light source component 312 or the LiDAR system 310. In some embodiments, the output beam 322 may have a substantially circular cross section.

It is also contemplated that the output beam 322 emitted by light source component 312 may be unpolarized or randomly polarized, may have no specific or fixed polarization (e.g., the polarization may vary with time), or may have a particular polarization (e.g., the output beam 322 may be linearly polarized, elliptically polarized, or circularly polarized).

In at least some embodiments, the output beam 322 and the input beam 324 may be substantially coaxial. In other words, the output beam 322 and input beam 324 may at least partially overlap or share a common propagation axis, so that the input beam 324 and the output beam 322 travel along substantially the same optical path (albeit in opposite directions). Nevertheless, in other embodiments, it is contemplated that the output beam 322 and the input beam 324 may not be coaxial, or in other words, may not overlap or share a common propagation axis inside the LiDAR system 310, without departing from the scope of the present technology.

It should be noted that in at least some embodiments of the present technology, the light source component 312 may be rotatable, such as by 360 degrees or less, about the axis of rotation (not depicted) of the LiDAR system 310 when the LiDAR system 310 is implemented in a rotatable configuration. However, in other embodiments, the light source component 312 may be stationary even when the LiDAR system 310 is implemented in a rotatable configuration, without departing from the scope of the present technology.

Internal Beam Paths

As schematically illustrated in FIG. 3, the LiDAR system 310 may make use of a given internal beam path from a plurality of internal beam paths 314 for emitting the output beam 322 (generated by the light source component 312) towards the surroundings 250. In one example, the given internal beam path amongst the plurality of internal beam paths 314 may allow providing the light from the light source component 312 to the scanner component 316 and, in turn, the scanner component 316 may allow the output beam 322 to be directed downrange towards the surroundings 250.

Also, the LiDAR system 310 may make use of another given internal beam path from the plurality of internal beam paths 314 for providing the input beam 324 to the receiver component 318. In one example, the another given internal beam path amongst the plurality of internal beam paths 314 may allow providing the input beam 324 from the scanner component 316 to the receiver component 318. In another example, the another given internal beam path amongst the plurality of internal beam paths 314 may allow providing the input beam 324 directly from the surroundings 250 to the receiver component 318 (without the input beam 324 passing through the scanner component 316).

It should be noted that the plurality of internal beam paths 314 may comprise a variety of optical components. For example, the LiDAR system 310 may include one or more optical components configured to condition, shape, filter, modify, steer, or direct the output beam 322 and/or the input beam 324. For example, the LiDAR system 310 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some embodiments, the given internal beam path and the another internal beam path from the plurality of internal beam paths 314 may share at least some common optical components, however, this might not be the case in each and every embodiment of the present technology.

Scanner Component

Generally speaking, the scanner component 316 steers the output beam 322 in one or more directions downrange towards the surroundings 250. The scanner component 316 may comprise a variety of optical components and/or mechanical-type components for performing the scanning of the output beam 322. For example, the scanner component 316 may include one or more mirrors, prisms, lenses, MEM components, piezoelectric components, optical fibers, splitters, diffractive elements, collimating elements, and the like. It should be noted the scanner component 316 may also include one or more actuators (not illustrated) driving at least some optical components to rotate, tilt, pivot, or move in an angular manner about one or more axes, for example.

The scanner component 316 may be configured to scan the output beam 322 over a variety of horizontal angular ranges and/or vertical angular ranges. In other words, the scanner component 316 may be instrumental in providing the LiDAR system 310 with a desired Region of Interest (ROI) 380. The ROI 380 of the LiDAR system 310 may refer to an area, a volume, a region, an angular range, and/or portion(s) of the surroundings 250 about which the LiDAR system 310 may be configured to scan and/or can capture data.

It should be noted that the scanner component 316 may be configured to scan the output beam 322 horizontally and/or vertically, and as such, the ROI 380 of the LiDAR system 310 may have a horizontal direction and a vertical direction. For example, the LiDAR system 310 may have a horizontal ROI of 360 degrees and a vertical ROI of 45 degrees.

The scanner component 316 may be communicatively coupled to the controller component 320. As such, the controller component 320 may be configured to control the scanner component 316 so as to guide the output beam 322 in a desired direction downrange and/or along a desired scan pattern. Broadly speaking, a scan pattern may refer to a pattern or path along which the output beam 322 is directed by the scanner component 316 during operation.

The LiDAR system 310 may thus make use of the scan pattern to generate a point cloud substantially covering the ROI 380 of the LiDAR system 310. As will be described in greater detail herein further below, this point cloud of the LiDAR system 310 may be used to render a multi-dimensional map of objects in the surroundings 250 of the vehicle 220.

In operation, in certain embodiments, the light source component 312 emits pulses of light (represented by the output beam 322) which the scanner component 316 scans across the ROI 380 of the LiDAR system 310 in accordance with the scan pattern. As mentioned above, the object 330 may reflect one or more of the emitted pulses. The receiver component 318 receives or detects photons from the input beam 324 and generates one or more representative data signals. For example, the receiver component 318 may generate an output electrical signal (not depicted) that is representative of the input beam 324. The receiver component 318 may also provide the so-generated electrical signal to the controller component 320 for further processing.

Receiver Component

The receiver component 318 is communicatively coupled to the controller component 320 and may be implemented in a variety of ways. For example, the receiver component 318 may comprise a photoreceiver, optical receiver, optical sensor, detector, photodetector, optical detector, optical fibers, and the like. As mentioned above, in some embodiments, the receiver component 318 acquires or detects at least a portion of the input beam 324 and produces an electrical signal that corresponds to the input beam 324. For example, if the input beam 324 includes an optical pulse, the receiver component 318 may produce an electrical current or voltage pulse that corresponds to the optical pulse detected by the receiver component 318.

It is contemplated that the receiver component 318 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiver component 318 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, the receiver component 318 may include electronic components configured to convert a received photocurrent (e.g., a current produced by an APD in response to a received optical signal) into a voltage signal. The receiver component 318 may also include additional circuitry for producing an analog or digital output signal that corresponds to one or more characteristics (e.g., rising edge, falling edge, amplitude, duration, and the like) of a received optical pulse.

Controller Component

Depending on the implementation, the controller component 320 may include one or more processors, an application-specific integrated circuit (ASIC), a field-programmable gate array (FPGA), and/or other suitable circuitry. The controller component 320 may also include non-transitory computer-readable memory to store instructions executable by the controller component 320 as well as data which the controller component 320 may produce based on the signals acquired from other internal components of the LiDAR system 310 and/or may provide signals to the other internal components of the LiDAR system 310. The memory can include volatile (e.g., RAM) and/or non-volatile (e.g., flash memory, a hard disk) components. The controller component 320 may be configured to generate data during operation and store it in the memory. For example, this data generated by the controller component 320 may be indicative of the data points in the point cloud of the LiDAR system 310.

It is contemplated that in at least some non-limiting embodiments of the present technology, the controller component 320 may be implemented in a similar manner to the electronic device 210 and/or the computer system 100, without departing from the scope of the present technology.

In addition to collecting data from the receiver component 318, the controller component 320 may also be configured to provide control signals to, and potentially receive diagnostics data from, the light source component 312 and the scanner component 316.

As previously stated, the controller component 320 is communicatively coupled to one or more of the light source component 312, the scanner component 316, and the receiver component 318. The controller component 320 may receive electrical trigger pulses from the light source component 312, where each electrical trigger pulse corresponds to the emission of an optical pulse by the light source component 312. The controller component 320 may further provide instructions, a control signal, and/or a trigger signal to the light source component 312 indicating when the light source component 312 is to produce optical pulses.

Just as an example, the controller component 320 may be configured to send an electrical trigger signal that includes electrical pulses, so that the light source component 312 emits an optical pulse in response to each electrical pulse of the electrical trigger signal. It is also contemplated that, the controller component 320 may cause the light source component 312 to adjust one or more characteristics of light produced by the light source component 312 such as, but not limited to: frequency, period, duration, pulse energy, peak power, average power, and wavelength of the optical pulses.

It should be noted that the controller component 320 may be configured to determine a "time-of-flight" value for an optical pulse based on timing information associated with (i) when a given pulse was emitted by light source component 312 and (ii) when a portion of the pulse (e.g., from the input beam 324) was detected or received by the receiver component 318.

It is contemplated that the controller component 320 may be configured to analyze one or more characteristics of the electrical signals from the light source component 312 and/or the receiver component 318 to determine one or more characteristics of the object 330 such as the distance 390 downrange from the LiDAR system 310.

For example, the controller component 320 may determine the time of flight value and/or a phase modulation value for the emitted pulse of the output beam 322. Let it be assumed that the LiDAR system 310 determines a time-of-light value "T" representing, in a sense, a "round-trip" time for an emitted pulse to travel from the LiDAR system 310 to the object 330 and back to the LiDAR system 310. As a result, the controller component 320 may be configured to determine the distance 390 in accordance with the following equation:

$$D = \frac{c * T}{2} \quad \text{(Equation 1)}$$

wherein D is the distance 390, T is the time-of-flight value, and c is the speed of light (approximately $3.0 \times 10^8$ m/s).

As previously alluded to, the LiDAR system 310 may be used to determine the distance to one or more other potential objects located in the surroundings 250. By scanning the output beam 322 across the ROI 380 of the LiDAR system 310 in accordance with a scanning pattern, the LiDAR system 310 is configured to map distances (similar to the distance 390) to respective data points within the ROI 380 of the LiDAR system 310. As a result, the LiDAR system 310 may be configured to render these data points captured in succession (e.g., the point cloud) in a form of a multi-dimensional map.

As an example, this multi-dimensional map may be used by the electronic device 210 for detecting, or otherwise identifying, objects or determining a shape or distance of potential objects within the ROI 380 of the LiDAR system 310. It is contemplated that the LiDAR system 310 may be configured to repeatedly/iteratively capture and/or generate point clouds at any suitable rate for a given application.

It should be noted that a location of a given object in the surroundings 250 of the vehicle 220 may be overlapped, encompassed, or enclosed at least partially within the ROI of the LiDAR system 310. For example, the object 330 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Specific System Components

Figure 4:
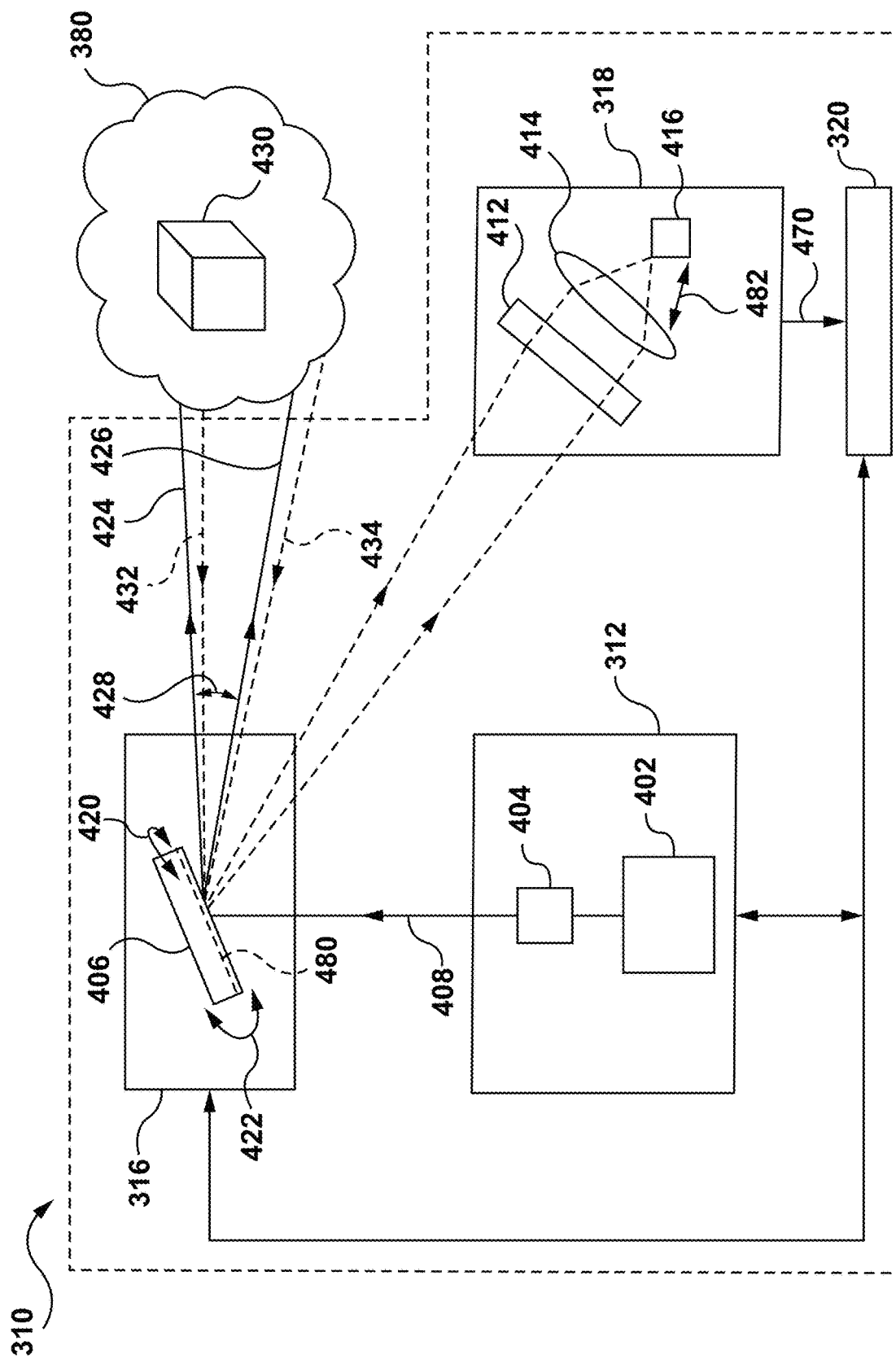
FIG. 4 depicts an implementation of the LiDAR system implemented in accordance to a specific non-limiting embodiment of the present technology.

With reference to FIG. 4, there is depicted an implementation of the LiDAR system 310 executed in accordance to a specific non-limiting embodiment of the present technology.

More specifically, in the LiDAR system 310 the light source component 312 comprises a laser 402 and a collimator 404, the scanner component 316 comprises a MEM component 406, and the receiver component 318 comprises an optical filter 412 (also referred to herein as a filter component), a receiving lens 414 and an optical detector 416. It is to be noted that other elements may be present but not illustrated for purposes of clarity.

The laser 402 is configured to generate the output beam 322. In certain embodiments, the generated output beam 322 comprises a plurality of sequential output beams 408. Further, each output beam 408 may be collimated and/or modulated by the collimator 404. As previously discussed, the LiDAR system 310 may make use of a given internal beam path from a plurality of internal beam paths 314 for emitting the output beam 408 towards the ROI 380.

In one example, the given internal beam path amongst the plurality of internal beam paths 314 may allow providing the collimated and/or modulated output beam(s) 408 from the collimator 404 towards the MEM component 406 associated with the scanner component 316. The MEM component 406 has a reflective surface 480 which is configured to receive and reflect the collimated and/or modulated output beam(s) 408 towards the ROI 380. The average diameter of the MEM component 406 may be between about 0.1 mm to about 10 mm.

In certain embodiments, the MEM component 406 is configured to move, such as by one or more of tilting, swinging and/or oscillating in one or more directions or angles (e.g., vertically, horizontally, diagonally, or a combination thereof), as indicated by the directions 420 and 422. In so doing, the MEM component 406 reflects the output beams 408 and redirects them in multiple angles (e.g., vertical and/or horizontal angles) as output beams 424 and 426, for example. It is to be noted that although the output beams 424 and 426 have been illustrated in one-dimensional vertical plane, the movement of the MEM component 406 may also spread the output beams 408 in one-dimensional horizontal plane or in both vertical and horizontal planes resulting in a two-dimensional ROI 380. Similarly, an angle of spread 428 between the output beams 424 and 426 may be a plane angle or a solid angle depending upon the spread in one dimension or in two dimensions. As an example, the range of angle, whether a plane angle or a solid angle, may be between about 15 degrees to about 60 degrees.

It is contemplated that in certain embodiments, the LiDAR system 310 may be configured to rotate horizontally to scan the ROI 380, while the MEM component 406 is configured to tilt, swing and/or oscillate in multiple directions or angles (e.g., vertically, horizontally, diagonally, or a combination thereof) to allow the laser 402 to emit the output beams 408 in multiple angles to obtain multiple angular resolutions of the one or more objects 430. In other embodiments, the MEM component 406 may be positioned on a platform (not shown) such that the platform may be configured to rotate on a horizontal plane. As an example, such platform may be located inside the LiDAR system 310 or may be a part of the common housing 340. In other embodiments, one or more of the scanner component 316 or the MEM component is arranged to rotate horizontally.

Thus, due to the movement of the MEM component 406, the reflected output beams 424 and 426 may be utilized to derive multiple angular resolutions of an object. As a result, in certain embodiments, only one LiDAR system 310 may scan and capture multiple angular resolutions of an object. The number of LiDAR systems (or number of light sources and light detectors) required to scan an object can be reduced and the cost for operating the SDC can also be reduced.

As previously discussed, the LiDAR system 310 may make use of a given internal beam path from a plurality of internal beam paths 314 for emitting the output beam 322 (generated by the light source component 312) towards the surroundings 250.

It is contemplated that at least a portion of the output beams 424 and 426 may be reflected by one or more objects 430 in the ROI 380. Such reflected portion of the output beams 424 and 426 is represented by input beams 432 and 434 which may return back towards the LiDAR system 310 and be captured by the LiDAR system 310 via the receiver component 318.

In certain embodiments, the LiDAR system 310 may make use of another given internal beam path from the plurality of internal beam paths 314 for providing the input beams 432 and 434 to the receiver component 318. In one example, the another given internal beam path amongst the plurality of internal beam paths 314 may allow providing the input beams 432 and 434 from the scanner component 316 to the receiver component 318. In another example, the another given internal beam path amongst the plurality of internal beam paths 314 may allow providing the input beams 432 and 434 directly from the ROI 380 to the receiver component 318 (without the input beams 432 and 434 passing through the scanner component 316).

In at least some embodiments, the return pathway associated with the input beams 432 and 434 reflected from the ROI 380 to the receiver component 318 may include a sub-portion that is a same path as one used by the output beams 424 and 426. As such, the return pathway may include the input beams 432 and 434 being incident on, and being reflected by, the MEM component 406. In other words, the output beams 424 and 426 and the input beams 432 and 434 may at least partially overlap or share a common propagation axis, so that the input beams 432 and 434 and the output beams 424 and 426 travel along substantially the same optical path (albeit in opposite directions).

Nevertheless, in other embodiments, it is contemplated that the output beams 424 and 426 and the input beams 432 and 434 may include a sub-portion that is a different path as one used by the output beams 424 and 426, or in other words, the input beams 432 and 434 and the output beams 424 and 426 may not overlap or share a common propagation axis inside the LiDAR system 310, without departing from the scope of the present technology.

The filter component 412 employed in the receiver component 318 may be configured to receive the input beams 432 and 434 and filter out the background noise (if any) in the input beams 432 and 434 from being detected by the optical detector 416. In one non-limiting embodiment, the filter component 412 may incorporate a single bandpass filter mirror. However, in another non-limiting embodiment, the filter component 412 may incorporate a plurality of bandpass filter mirrors having associated filter pass bands centered about the operating frequency of the output beams 424 and 426. The output beams 424 and 426 may exhibit high out-of-band rejection, as well as low in-band attenuation. Further, the bandwidth associated with the filter component 412 may be sufficiently narrow so as to substantially filter or remove components of the solar radiation or stray light in the input beams 432 and 434, yet sufficiently broad so as to be substantially larger than the bandwidth of the thermally-broadened spectrum in combination with the largest expected associated Doppler shift. For example, in certain embodiments, filter component 412 may be configured so as to provide for maximum filtering of light frequencies that are outside the frequency band of interest, e.g. greater than about 2 nanometers (nm) above or below a nominal center frequency of the output beams 424 and 426.

The filtered input beams 432 and 434 may then be directed to the receiving lens 414. The receiving lens 414 may be configured to focus the filtered input beams 432 and 434 to the optical detector 416. It is to be noted that in certain embodiments, the LiDAR system 310 using a suitable internal beam path from the plurality of internal beam paths 314 may directly provide the input beams 432 and 434 to the receiving lens 414 without passing them through the filter component 412. In some other embodiments, the LiDAR system 310 using a suitable internal beam path from the plurality of internal beam paths 314 may directly provide the input beams 432 and 434 to the optical detector 416 without passing them through the filter component 412.

Figure 5:
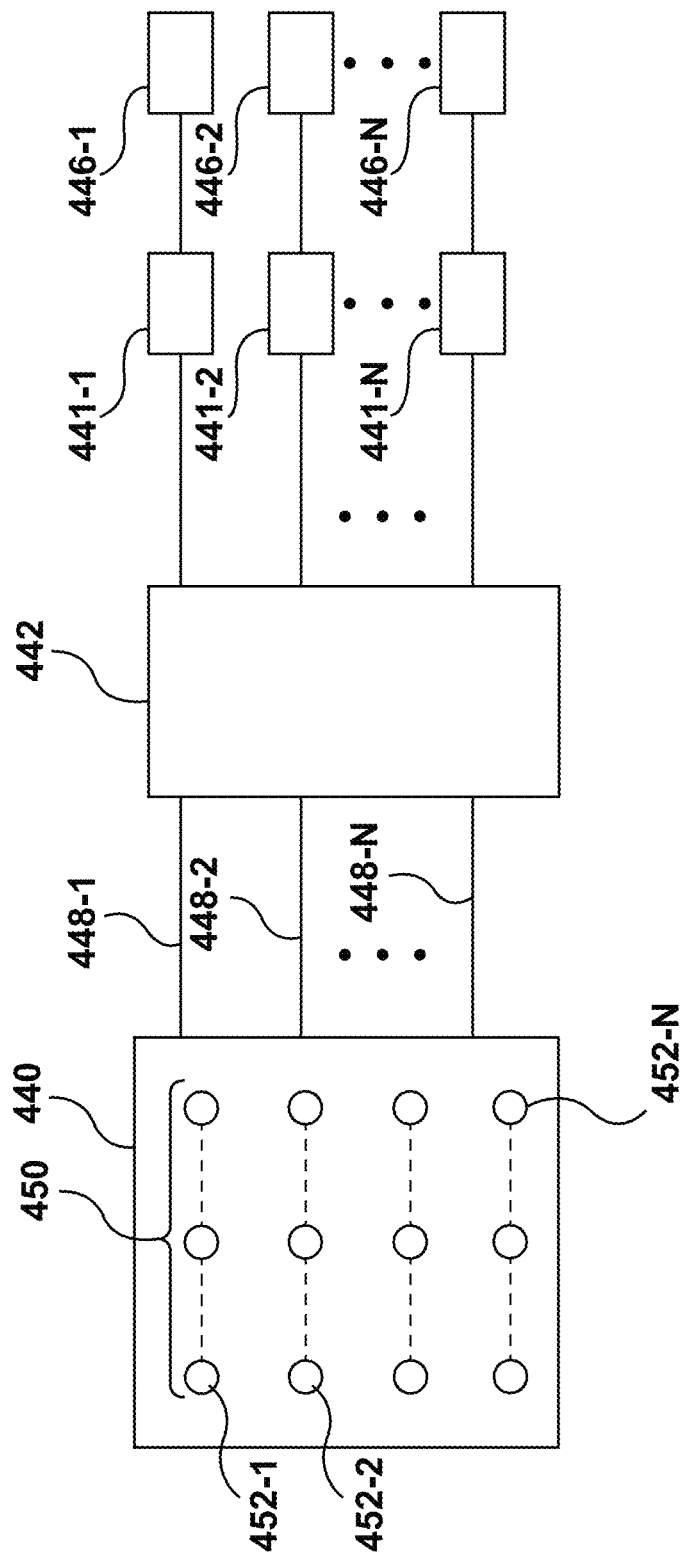
FIG. 5 depicts a representative implementation of an optical detector implemented in accordance to a specific non-limiting embodiment of the present technology.

FIG. 5 depicts a representative implementation of an optical detector 416 executed in accordance to a specific non-limiting embodiment of the present technology. As depicted, in certain embodiments, the optical detector 416 employs an fiber optic array 440 and a plurality of detectors 446-1, 446-2, . . . 446-N. The fiber optic array 440 comprises a plurality of optical fibers 450. The plurality of optical fibers 450 associated with the fiber optic array 440 may be connected to the plurality of detectors 446-1, 446-2, . . . 446-N to form N optical paths 448-1, 448-2, . . . 448-N from the fiber optic array 440 to the plurality of detectors 446-1, 446-2, . . . 446-N.

In certain embodiments, the plurality of detectors 446-1, 446-2, . . . 446-N correspond, one-to-one, to the plurality of optical fibers 450 associated with the fiber optic array 440, and each detector in the plurality of detectors 446-1, 446-2, . . . 446-N may be configured to receive the input beams 432 and 434 through the fiber optic array 440. In other words, a given optical fiber 450 of the fiber optic array 440 is associated with a given detector of the plurality of detectors 446-1, 446-2, . . . 446-N, in a one-to-one relationship. In these embodiments, a given optical fiber and a given detector are connected by a given optical path.

In the above one-to-one arrangement of the plurality of detectors 446-1, 446-2, . . . 446-N and the plurality of optical fibers 450, an increased density of data points in the given ROI 380 may be achieved, and hence an increased resolution of the object in the ROI 380, as will be described below. By increased density of data points in the given ROI 380 is meant an increased number of output beams incident in the ROI 380 in a given time, and subsequently an increased number of data points defined in the ROI 380 in the given time.

In embodiments with the one-to-one arrangement, the controller component 320 may be configured to monitor which of the optical fibers of the plurality of optical fibers 450 and its associated detector is receiving which input beam, such as input beams 432 and 434. With this monitoring process, the light source component 312 may be configured to emit the output beam 408 without waiting for the detection of the input beams 432 and 434 resulting in the increased density of the data points.

It is contemplated that in certain other embodiments, instead of a one-to-one relationship between optical fibres of the fiber optic array 440 and the plurality of detectors 446-1, 446-2, . . . 446-N, a subset of the plurality of optical fibers 450 associated with the fiber optic array 440 may have a common detector from the plurality of detectors 446-1, 446-2, . . . 446-N. In these embodiments, there would be a plurality of optical paths associated with a single detector. In such embodiments, reducing the number of detectors may also result in a costs saving. Also, in certain embodiments the common detector from the plurality of detectors 446-1, 446-2, . . . 446-N may require less power and space thereby, saving some physical space power requirement while implementing the LiDAR system 310.

In certain embodiments, the optical detector 416 may also include an optical fiber connector 442 and a plurality of micro-lens 444-1, 444-2, . . . 444-N. The optical fiber connector 442 may be configured to connect the plurality of optical fibers 450 associated with the fiber optic array 440 to the plurality of detectors 446-1, 446-2, . . . 446-N to form the N optical paths 448-1, 448-2, . . . 448-N from the fiber optic array 440 to the plurality of detectors 446-1, 446-2, . . . 446-N. The plurality of micro-lens 444-1, 444-2, . . . 444-N may correspond, one-to-one, to the plurality of detectors 446-1, 446-2, . . . 446-N, and may be configured to converge the input beams 432 and 434 transmitted via the plurality of optical fibers 450 associated with the fiber optic array 440 to the corresponding plurality of detectors 446-1, 446-2, . . . 446-N.

Turning now to the optical fibers, it is contemplated that in certain embodiments, the plurality of optical fibers 450 may be constructed as the fiber optic array 440 in any manner, such as by laser welding, butt welding, soldering, or the like. Further, at least some of the optical fibers in the plurality of optical fibers 450 may have a polarization-maintaining axis which is oriented or aligned based on positioning of the plurality of optical fibers. As an example, the polarization-maintaining axis of the plurality of optical fibers 450 are all aligned to be substantially parallel to a single plane. As such, the polarization-maintaining axis may assist the plurality of optical fibers 450 to control and maintain certain polarizations for example linear polarization.

In certain embodiments, at least some of the optical fibers of the plurality of optical fibers 240 may have a circular cross-section. In certain other embodiments, at least some of the optical fibers of the plurality of optical fibers 240 may have a cross-section which is not circular, such as a polygonal (e.g., octagon, hexagon or other suitable polygon) shape, or a curved circumference having at least one flat (e.g., a flatted side on a circular cross section), or any other shape. The optical fibers of the plurality of optical fibers 250 may have any suitable refractive index.

In certain embodiments, at least some of the optical fibers of the plurality of optical fibers 250 may further include a filter, such as a fiber Bragg grating (FBG) filters (not depicted) to filter certain wavelengths of light. In certain embodiments, FBG filters reflect certain wavelengths of light and transmit other wavelengths.

It is contemplated that the individual optical fibers in the fiber optic array 440 may be arranged in any manner such as in aligned rows, staggered rows, circular or spiral configuration, or the like. It will be appreciated that the physical characteristics of the plurality of optical fibers 250 or how the plurality of optical fibers are arranged in the fiber optic array 440 should not limit the scope of present technology by any means.

The plurality of optical fibers 450 associated with the fiber optic array 440 has receiving ends 452-1, 452-2, . . . 452-N which are arranged to receive at least one of the input beams 432 and 434. The receiving ends 452-1, 452-2, . . . 452-N of the plurality of optical fibers 450 are arranged as a two dimensional fiber optic array 440. The receiving ends of the plurality of optical fibers 450 may be equally or unequally spaced from one another. The fiber optic array 440 may have an equal or unequal number of receiving ends along an x-axis or a y-axis.

In certain embodiments, the receiving lens 414 may be configured to focus at least one of the input beams 432 and 434 to one of the receiving ends 452-1, 452-2, . . . 452-N. In certain embodiments, a distance 482 between the receiving lens 414 and one of the receiving ends 452-1, 452-2, . . . 452-N comprises a focal distance of at least one of the input beams 432 and 434. The end face of the fiber optic array 440 may be on a focal plane of the receiving lens 414. Further, for a given detection time interval, the receiving lens 414 may be configured to focus different input beams to different receiving ends of the receiving ends 452-1, 452-2, . . . 452-N of the plurality of optical fibers 450. In this respect, in certain embodiments the receiving lens 414 may be configured to move or tilt in a suitable manner such that at least one the input beams 432 and 434 may be focused on at least one of plurality of optical fibers 450. It is to be noted that the movement of the receiving lens 414 may be controlled by the controller component 320.

As previously discussed, in certain embodiments, the plurality of detectors 446-1, 446-2, . . . 446-N may be configured to detect at least a portion of the input beams 432 and 434 and produce an electrical signal that corresponds to the input beams 432 and 434. For example, if the input beams 432 and 434 includes an optical pulse, the plurality of detectors 446-1, 446-2, . . . 446-N may produce electrical signals 470 such as electrical current or voltage pulses that corresponds to the optical pulses detected by the plurality of detectors 446-1, 446-2, . . . 446-N.

It is contemplated that the plurality of detectors 446-1, 446-2, . . . 446-N may be implemented as photodetectors with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In certain embodiments, the plurality of detectors 446-1, 446-2, . . . 446-N may be communicatively coupled to the controller component 320. The controller component 320 may be configured to receive the electrical signals 470 from the plurality of detectors 446-1, 446-2, . . . 446-N. The controller component 320 may further be configured to analyse the electrical signals 470 to detect one or more objects 430 in the ROI 380. It is contemplated that the controller component 320 may use any suitable techniques (such as, techniques based on determining "Time-of-Flight" as previously discussed) for detecting objects without departing from the principles presented herein.

The controller component 320 may further be communicatively coupled to the scanner component 316, more specifically to the MEM component 406, to control the movement of the MEM component 406, and more specifically one or more of the tilting, swinging and/or oscillation amplitudes of the MEM component 406. In particular, initially the MEM component 406 may be oscillating about vertical axis at first oscillation amplitude to spread the output beams 424 and 426 by a vertical interval 504 (discussed below) along a vertical axis in the ROI 380. Upon detecting the one or more objects 430 in the ROI 380 based on input beams 432 and 434, the controller component 320 may be configured to modulate the first oscillation amplitude of the MEM component 406 to be modulated to first modulated oscillation amplitude. In so doing, the controller component 320 reduces the vertical interval 504 (discussed below) of the output beams 424 and 426 around the one or more objects 430. In certain embodiments, the first oscillation amplitude is greater than the first modulated oscillation amplitude. As such, the first oscillation amplitude ranges between +/−15 degrees and the first modulated oscillation amplitude rages between +/−14 degrees. For example, if the first oscillation amplitude is 15 degrees then the first modulated oscillation amplitude may 14 degrees or 13 degrees or so.

In certain embodiments, initially the MEM component 406 may also be oscillating about horizontal axis at a second oscillation amplitude to spread the output beams 424 and 426 by a horizontal interval 514 (discussed below) along a horizontal axis in the ROI 380. Upon detecting the one or more objects 430 in the ROI 380 based on input beams 432 and 434, the controller component 320 may be configured to modulate the second oscillation amplitude of the MEM component 406 to be modulated to the second modulated oscillation amplitude. In so doing, the MEM controller component 406 reduces the horizontal interval 514 (discussed below) of the output beams 424 and 426 around the one or more objects 430. In certain embodiments, the second oscillation amplitude is greater than the second modulated oscillation amplitude. As such, the second oscillation amplitude ranges between +/−15 degrees and the second modulated oscillation amplitude rages between +/−14 degrees. For example, if the second oscillation amplitude is 15 degrees then the second modulated oscillation amplitude may 14 degrees or 13 degrees or so.

The controller component 320 may further be communicatively coupled to the light source component 312 in such a manner that the controller component 320 may be configured to control the emissions from the light source component 312. In one embodiment, the emission of the next output beam(s) after the emission of the output beam 408 may be coordinated with detection of the input beams 432 and 434 by the optical detector 416. As such, the controller component 320 may be configured to cause the light source component 312 to emit the output beam(s) after the emission of the output beam 408 after the input beams 432 and 434 has been detected. While in other embodiments, the light source component 312 may be configured to operate independently of the optical detector 416. That is, the light source component 312 may emit next output beam(s) after the emission of the output beam 408 without coordinating with the detection of the input beams 432 and 434 by the optical detector 416.

FIGS. 6 and 7 depict representative examples of the vertical interval and reduced vertical interval associated with the output beam(s) along the vertical axis, in accordance various embodiments of present technology. As depicted in FIG. 6, the LiDAR system 310 emits output beam(s) 502 spread over the vertical interval 504 in the ROI 380. Further, as depicted in FIG. 7, upon detecting the one or more objects 430 in the ROI 380 the LiDAR system 310 may be configured to reduce the spread of the output beam(s) 502. The output beam(s) 502 with reduced spread are now represented as output beam(s) 506. As such, the output beam(s) 506 are now spread over reduced vertical interval 508 around the one or more objects 430 in a sub-region of interest 510. The sub-region of interest 510 is within the ROI 380.

It is to be noted that in certain embodiments the output beam(s) 502 may be associated with the first oscillation amplitude of the MEM component 406 and may define the one-dimensional ROI 380 in this case. Further, the output beam(s) 506 may be associated with the first modulated oscillation amplitude of the MEM component 406 and may define one-dimensional sub-region of interest 510 within the ROI 380. As previously discussed, the output beam(s) 502 and 506 may comprise of sequential output beam(s), a density of sequential beam(s) 506 incident in the sub-region of interest 510 may be higher than a density of sequential output beam(s) 502 in the ROI 380.

Figure 8:
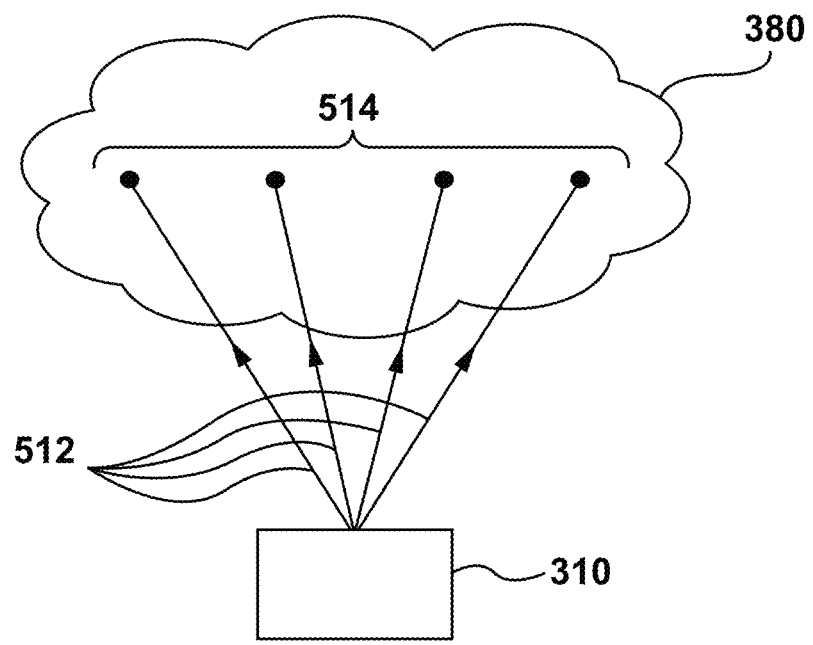
FIGS. 8 and 9 depict representative examples of a horizontal interval, and a reduced horizontal interval, respectively, associated with the output beams along a horizontal axis, in accordance various embodiments of present technology.
Figure 9:
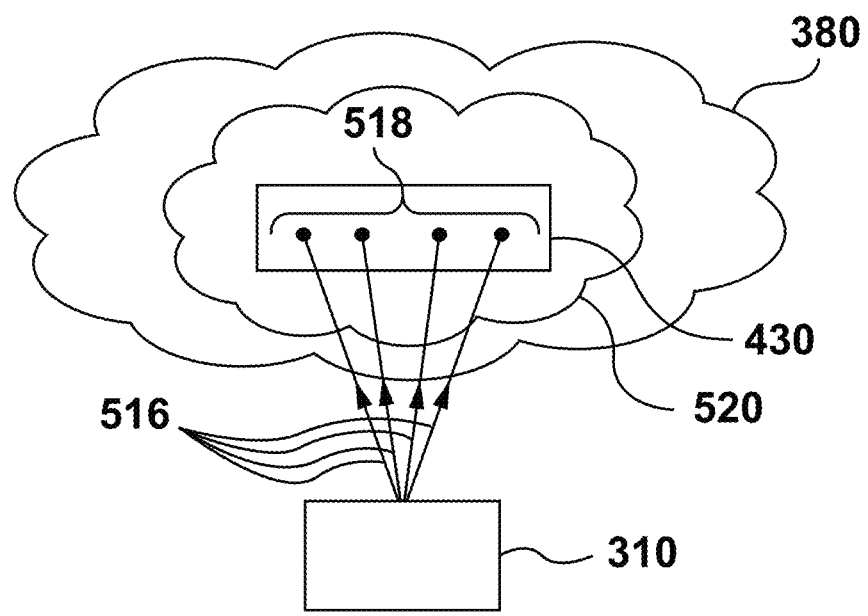

FIGS. 8 and 9 depict representative examples of the horizontal interval and reduced horizontal interval associated with the output beam(s) along the horizontal axis, in accordance various embodiments of present technology. As depicted in FIG. 8, the LiDAR system 310 emits output beam(s) 512 spread over the horizontal interval 514 in the ROI 380. Further, as depicted in FIG. 9, upon detecting the one or more objects 430 in the ROI 380 the LiDAR system 310 may be configured to reduce the spread of output beam(s) 512. The output beam(s) 512 with reduced spread are now represented as output beam(s) 516. As such, the output beam(s) 516 are now spread over reduced horizontal interval 518 around the one or more objects 430 in a sub-region of interest 520. The sub-region of interest 520 is within the ROI 380.

It is to be noted that in certain embodiments the output beam(s) 512 may be associated with the second oscillation amplitude of the MEM component 406 and may define the one-dimensional ROI 380 in this case. Further, the output beam(s) 516 may be associated with the first modulated oscillation amplitude of the MEM component 406 and may define one-dimensional sub-region of interest 520 within the ROI 380. As previously discussed, the output beam(s) 512 and 516 may comprise of sequential output beam(s), a density of sequential beam(s) 516 incident in the sub-region of interest 520 may be higher than a density of sequential output beam(s) 512 in the ROI 380.

Figure 10:
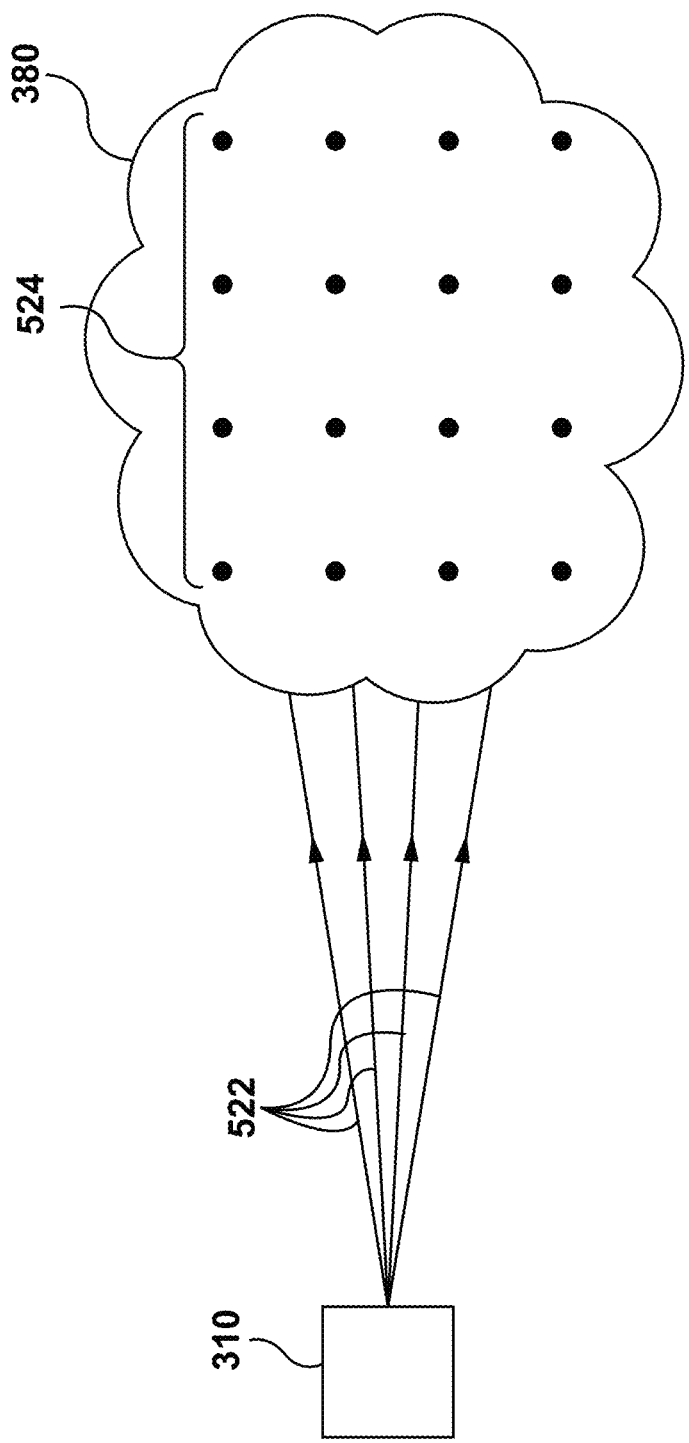
FIGS. 10 and 11 depict representative examples of a two-dimensional vertical and horizontal intervals, and a reduced two-dimensional vertical and horizontal intervals, respectively, associated with the output beams along the vertical axis and horizontal axis, in accordance various embodiments of present technology.
Figure 11:
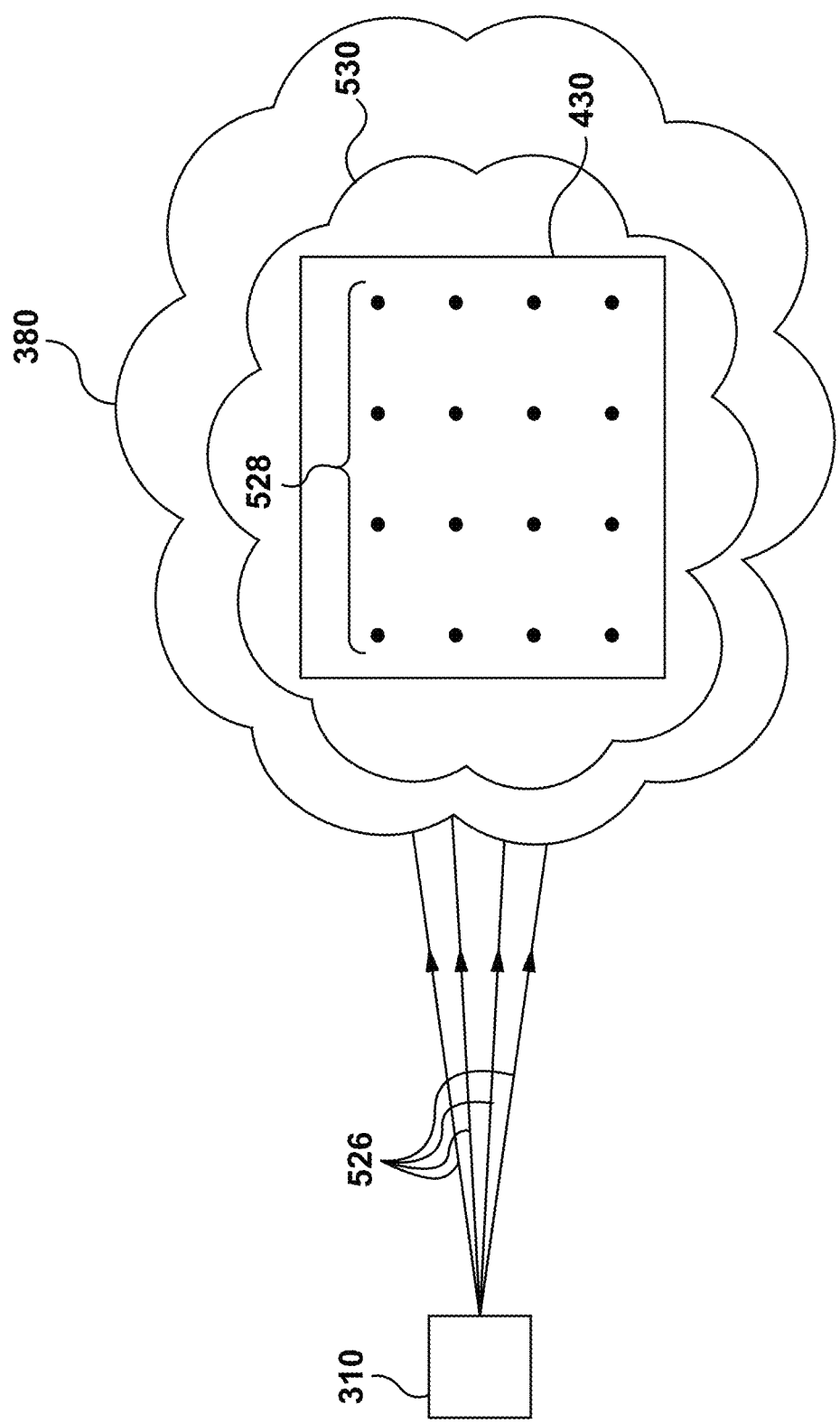

FIGS. 10 and 11 depict representative examples of the two-dimensional horizontal and vertical intervals and reduced two-dimensional horizontal and vertical intervals associated with the output beam(s) along the vertical and horizontal axis, in accordance various embodiments of present technology. As depicted in FIG. 10, the LiDAR system 310 emits output beam(s) 522 spread over the horizontal and vertical intervals 524 in the ROI 380. Further, as depicted in FIG. 11, upon detecting the one or more objects 430 in the ROI 380 the LiDAR system 310 may be configured to reduce the spread of output beam(s) 522. The output beam(s) 522 with reduced spread are now represented as output beam(s) 526. As such, the output beams(s) 526 are now spread over reduced horizontal and vertical intervals 528 around the one or more objects 430 in a sub-region of interest 530. The sub-region of interest 530 is within the ROI 380.

It is to be noted that in certain embodiments the output beam(s) 522 may be associated with the first and second oscillation amplitudes of the MEM component 406 and may define the two-dimensional ROI 380 in this case. Further, the output beam(s) 526 may be associated with the first and second modulated oscillation amplitudes of the MEM component 406 and may define two-dimensional sub-region of interest 530 within the ROI 380. As previously discussed, the output beam(s) 522 and 526 may comprise of sequential output beam(s), a density of sequential beam(s) 526 incident in the sub-region of interest 530 may be higher than a density of sequential output beam(s) 522 in the ROI 380.

It is to be noted that FIGS. 6-11 depict various intervals such as vertical interval 504, reduced vertical interval 508, horizontal interval 514, reduced horizontal interval 514, horizontal and vertical interval 524 or reduced horizontal and vertical interval 528 as discrete intervals. However, in certain embodiments, the MEM component 406 may be configured to oscillate continuously resulting in continuous scanning of the ROI 380. In doing so, the fiber optic array 440 based receiver component 318 may provide a higher resolution for the controller component 320 to render the additional data points captured in succession (e.g., the point cloud) in a form of the multi-dimensional map of one or more objects 430 in the ROI 380.

Computer-Implemented Methods

Figure 12:
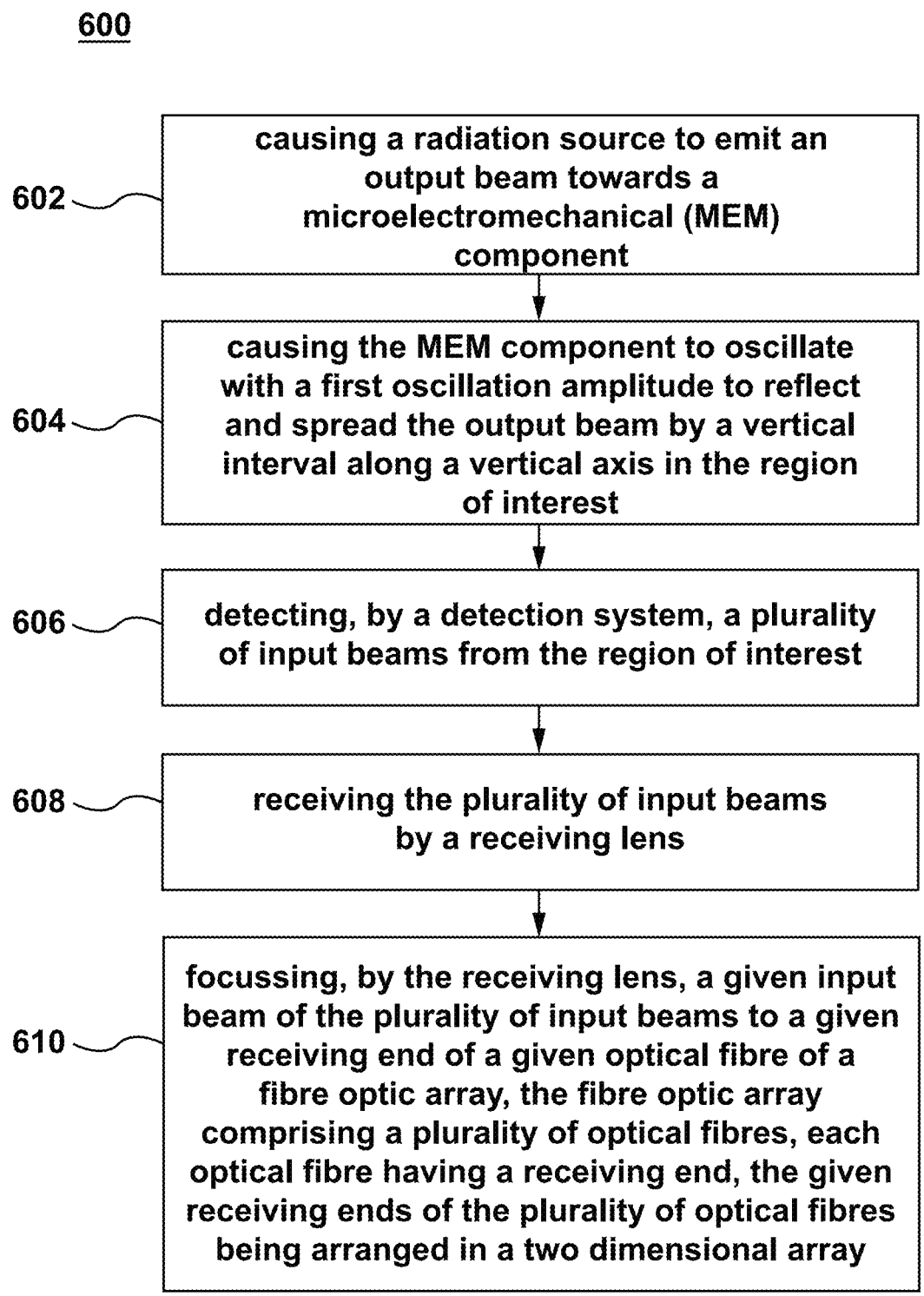
FIG. 12 illustrates a flowchart of a method 600 for detecting objects in a region of interest, in accordance with various non-limiting embodiments of the present technology.

Now turning to FIG. 12, a flowchart of a method 600 for detecting objects in a region of interest is illustrated, in accordance with various non-limiting embodiments of the present technology.

In some non-limiting embodiments of the present technology, the method 600 may be implemented by the controller component 320 communicatively connected to the LiDAR system 310. As previously discussed that in at least some non-limiting embodiments of the present technology, the controller component 320 may include one or more processors and may be implemented in a similar manner to the electronic device 210 and/or the computer system 100, without departing from the scope of the present technology. The method 600 begins at step 602.

Step 602: causing a radiation source to emit an output beam towards a microelectromechanical (MEM) component.

At step 602, the controller component 320 provides instructions, a control signal, and/or a trigger signal to the light source component 312 indicating when the radiation source component 312 (such as the light source component) is to emit the output beam 408 towards the MEM component 406. In one or more steps associated with the method 600, the controller component 320 may be configured to cause the light source component 312 to emit the output beam 408 towards the MEM component 406 in certain conditions. Such conditions may include but are not limited to: upon operating the vehicle 220 in self-driving mode, when the vehicle 220 is in motion irrespective of the driving mode, when the vehicle 220 is stationary, when the vehicle 220 is initially turned on, or based on a manual operation performed by a user (not depicted) operating the vehicle 220 etc.

Step 604: causing the MEM component to oscillate with a first oscillation amplitude to reflect and spread the output beam by a vertical interval along a vertical axis in the region of interest.

At step 604, the MEM component 406 oscillating about vertical axis at first oscillation amplitude spreads the output beams 424 and 426 by a vertical interval 504 along a vertical axis in the region of interest (ROI) 380.

Step 606: detecting, by a detection system, a plurality of input beams from the region of interest.

At step 606, at least a portion of the output beams 424 and 426 reflected by one or more objects 430 in the ROI 380 represented by input beams 432 and 434 returns back towards the LiDAR system 310. The input beams 432 and 434 are captured by the LiDAR system 310 via the receiver component 318.

Step 608: receiving the plurality of input beams by a receiving lens.

At step 608, the receiving lens 414 is configured to receive the inputs beams 432 and 434.

Step 610: focussing, by the receiving lens, a given input beam of the plurality of input beams to a given receiving end of a given optical fibre of a fibre optic array, the fibre optic array comprising a plurality of optical fibres, each optical fibre having a receiving end, the given receiving ends of the plurality of optical fibres being arranged in a two dimensional array Finally at step 608, the receiving lens 414 may be configured to focus at least one of the input beams 432 and 434 to one of the receiving ends 452-1, 452-2, . . . 452-N of the plurality of optical fibers 450 associated with the fiber optic array 440.

In one or more non-limiting steps associated with the method 600, in order to determine one or more objects 430 in the ROI 380, the controller component 320 may be configured to determine a "time-of-flight" value for a light beam based on timing information associated with (i) when a given light beam (e.g. output beam 408) was emitted by light source component 312 and (ii) when a portion of the light beam (e.g., from the input beams 432 and 434) was detected or received by the receiver component 318.

In one or more non-limiting steps associated with the method 600, the controller component 320 may be configured to provide control signals to MEM component 406 to oscillate at the first and/or second modulated oscillation amplitude until the controller component 320 receives sufficient data points in the point cloud of the LiDAR system 310 associated with the one or more objects 430. As a result, the controller component 320 may be configured to render these data points captured in succession (e.g., the point cloud) in a form of the multi-dimensional map of one or more objects 430 in the ROI 380.

In other non-limiting steps associated with the method 600, once the multi-dimensional map of one or more objects 430 has been rendered, the controller component 320 may be configured to provide control signals to MEM component 406 to oscillate with original oscillations i.e. the first and/or second oscillation amplitude. In so doing, the LiDAR system 310 may again scan the vertical interval 504, horizontal interval 514 or horizontal and vertical interval 524.

In one or more non-limiting steps associated with the method 600, the controller component 320 may control the emission of the next output beam(s) after the emission of the output beam 408 and such emission may be coordinated with detection of the input beams 432 and 434 by the optical detector 416. As such, the controller component 320 may be configured to cause the light source component 312 to emit the output beam(s) after the emission of the output beam 408 after the input beams 432 and 434 has been detected.

In one or more non-limiting steps associated with the method 600, the light source component 312 may be configured to operate independently of the optical detector 416. That is, the light source component 312 may emit next output beam(s) after the emission of the output beam 408 without coordinating with the detection of the input beams 432 and 434 by the optical detector 416.

It should be apparent to those skilled in the art that at least some embodiments of the present technology aim to expand a range of technical solutions for addressing a particular technical problem, namely improving performance of a LiDAR system while reducing the hardware burden imposed on various LiDAR systems by incorporating MEM components and modulating the amplitude of oscillations associated with the MEM components for selectively controlling the intervals of the output beam(s).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A LiDAR system for detecting objects in a region of interest, the system comprising:
a radiation source for emitting a plurality of output beams;
a microelectromechanical (MEM) component having a reflective surface for receiving the plurality of output beams and for reflecting the plurality of output beams towards the region of interest, the MEM component configured to oscillate about a first oscillation axis by a first oscillation amplitude to modulate each one of the plurality of output beams by a vertical interval along a vertical axis in the region of interest;
a detection system for detecting a plurality of input beams from the region of interest, the detection system comprising:
a fibre optic array arranged to transmit the plurality of input beams to at least one photodetector, the fibre optic array comprising a plurality of optical fibres, each optical fibre having a receiving end, the receiving ends of the plurality of optical fibres being arranged in a two dimensional array; and
a receiving lens configured to move to focus each different input beam of the plurality of input beams to a receiving end of a different optical fibre of the fibre optic array, wherein a distance between the receiving lens and the receiving ends of the plurality of optical fibres in the fibre optic array comprises a focal distance of the plurality of input beams.

2. The LiDAR system of claim 1, wherein a return pathway for the plurality of input beams from the region of interest to the detection system includes a sub-portion that is a same path as one used for the output beam.

3. The LiDAR system of claim 2, wherein the return pathway includes the plurality of input beams being incident on, and being reflected by, the MEM component.

4. The LiDAR system of claim 1, wherein a return pathway for the plurality of input beams from the region of interest to the detection system includes a sub-portion that is a different path as one used for the output beam.

5. The LiDAR system of claim 1, wherein the radiation source is configured to emit a given output beam of the plurality of beams independently of a detection, by the detection system, of a given input beam of the plurality of input beams.

6. The LiDAR system of claim 1, wherein the radiation source is configured to emit a given output beam of the plurality of beams in a synchronized manner with a detection, by the detection system, of a given input beam of the plurality of input beams.

7. The LiDAR system of claim 1, wherein each given optical fibre of the (Original) fibre optic array has an associated photodetector.

8. The LiDAR system of claim 1, wherein at least a subset of the plurality of optical fibres of the fibre optic array have a common photodetector.

9. The LiDAR system of claim 1, wherein the radiation source is one of: a single laser system and a double laser system.

10. The LiDAR system of claim 1, wherein the MEM component is positioned on a platform which is configured to rotate on a horizontal plane.

11. The LiDAR system of claim 1, further comprising a collimator for modulating a direction of the plurality of output beams towards the MEM component.

12. The LiDAR system of claim 1, further comprising a processor which is configured to, responsive to a determination that there is an object in the region of interest, cause the first oscillation amplitude of the MEM component to be modulated to a first modulated oscillation amplitude to reduce the vertical interval of the plurality of output beams around the object.

13. The LiDAR system of claim 1, wherein a diameter of the MEM component is between 0.1 mm to 10 mm.

14. The LiDAR system of claim 1, wherein the MEM component is configured to oscillate in multiple directions.

15. The LiDAR system of claim 1, wherein the plurality of output beams and the plurality of input beams share a common propagation axis.

16. A LIDAR method for detecting objects in a region of interest, the method being implemented by a processor communicatively connected to a LiDAR system, the method comprising:
causing a radiation source to emit an output beam towards a microelectromechanical (MEM) component;
causing the MEM component to oscillate with a first oscillation amplitude to reflect and spread the output beam by a vertical interval along a vertical axis in the region of interest;
detecting, by a detection system, a plurality of input beams from the region of interest, the detecting comprising:
receiving the plurality of input beams by a receiving lens;
moving the receiving lens to focus each different input beam of the plurality of input beams to a receiving end of a different optical fibre of a fibre optic array, the fibre optic array comprising a plurality of optical fibres, each optical fibre having a receiving end, the receiving ends of the plurality of optical fibres being arranged in a two dimensional array.

17. The LiDAR method of claim 16, wherein the method further comprises causing, by the processor, the radiation source to emit the plurality of output beams independently of the detection of the plurality of input beams by the detection system.

18. The LiDAR method of claim 16, wherein the method further comprises causing, by the processor, the radiation source to emit the plurality of output beams in coordination with the detection of the plurality of input beams by the detection system.

* * * * *